Feb. 1, 1966     S. OSTROW     3,232,194
CAMERA AND FLASHLIGHT COMBINATION
Original Filed Dec. 20, 1961     2 Sheets-Sheet 1
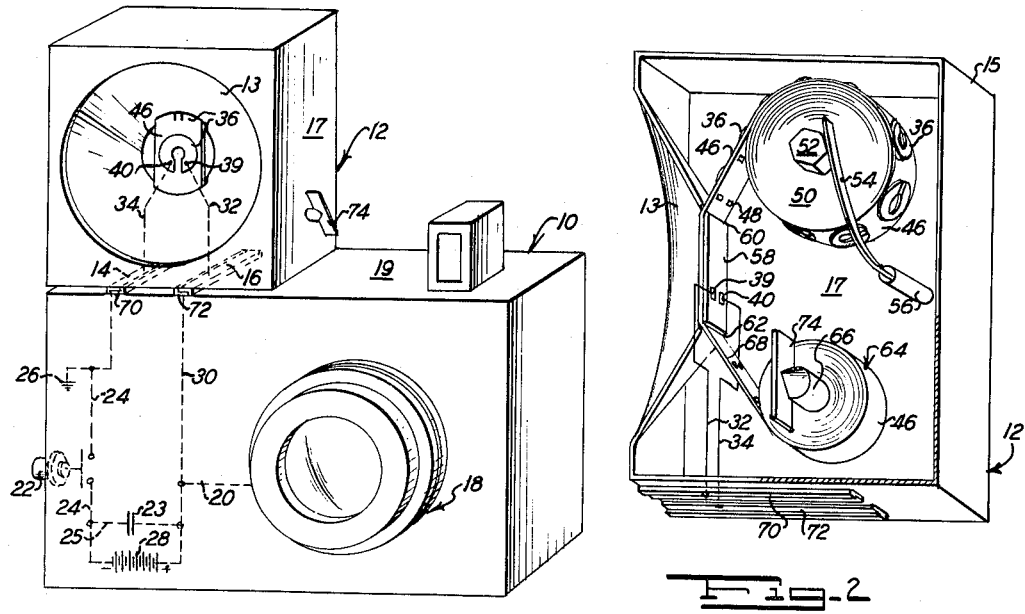
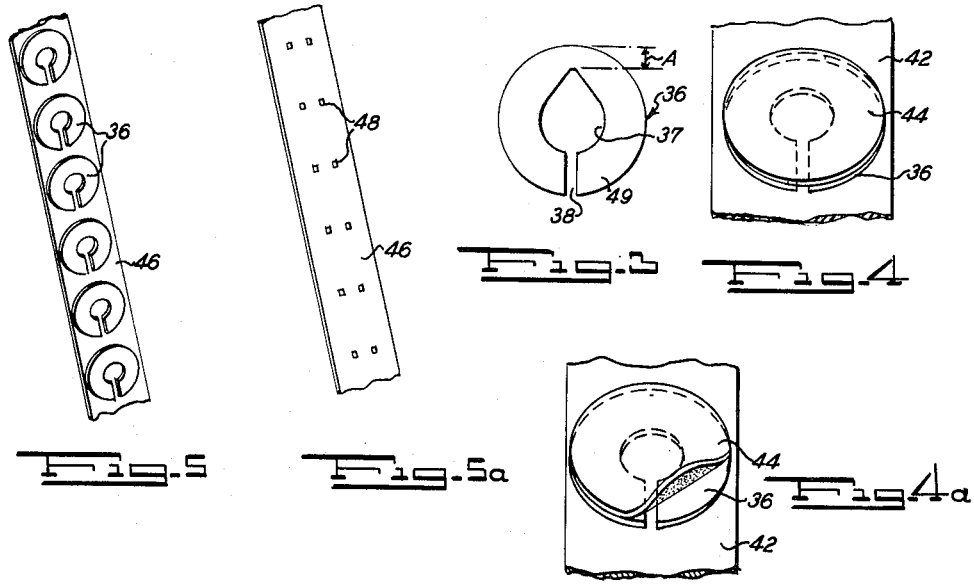
INVENTOR
STANLEY OSTROW
BY *Sol B. Wiczer*
ATTORNEY Feb. 1, 1966 S. OSTROW 3,232,194
CAMERA AND FLASHLIGHT COMBINATION
Original Filed Dec. 20, 1961 2 Sheets-Sheet 2
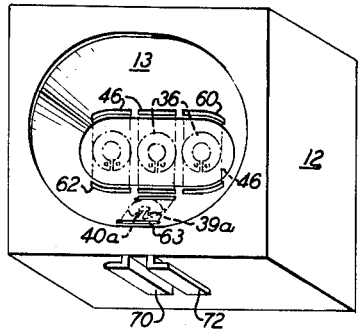
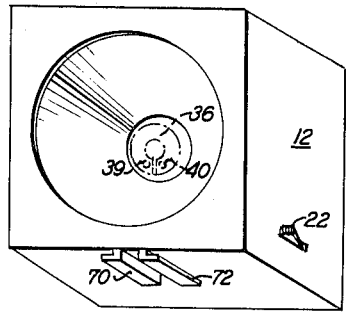
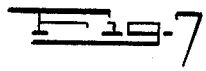
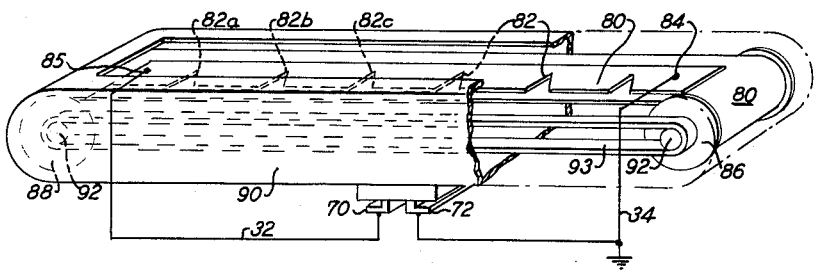
INVENTOR
STANLEY OSTROW
BY
*Sol B. Wiex*
ATTORNEY United States Patent Office 3,232,194
Patented Feb. 1, 1966

3,232,194
CAMERA AND FLASHLIGHT COMBINATION
Stanley Ostrow, Silver Spring, Md., assignor, by mesne assignments, to Allen A. Sperling, Washington, D.C.
Continuation of application Ser. No. 160,883, Dec. 20, 1961. This application May 21, 1965, Ser. No. 463,400
7 Claims. (Cl. 95—11.5)

This application is a continuation of application Serial No. 160,883, filed December 20, 1961, now abandoned.

This invention relates to a metal foil flashlighting product, and particularly a flashing foil mounted on a tape. The invention further relates to a device for holding a tape with flash lighting foil mounted thereon operative intermittently for flashing as desired, synchronized with a photographic camera whereby each flash supplies the necessary light for photographing an object. The invention further provides a means for continuously flashing in strip form to produce larger light intensity. The invention further includes the combination of the flashing foil with combustible or explosive means to effect ignition thereof. The invention is a continuation-in-part of application Serial No. 30,037, filed May 18, 1960, and now Patent No. 3,143,069.

According to this invention, I have found that thin metal foil such as from 0.0035 to .0065 inch thick, preferably about .004 to .006 inch suitably notched, can be ignited by an electric current and will burn in air with a sufficient flash for photographic or for ignition purposes.

Metal foils of greater or less thickness require a greater or less igniting current and give a greater or less quality of light including a controlled duration of flash. Thicker metals tend to conduct the electricity from the energizing source without heating the metal to the ignition point in air, so that a metal foil thickness greater than that given requires heavier electrical current for igniting; and foil thinner than that given tends to require metal foil of larger surface area to give a sufficient flash for photographic purposes. Accordingly, the foil thickness limits as given here have been practically selected within these objectives.

The foil for flash purposes needs to be notched as a control to present a limited quantity of metal, at least at one point between the electrodes, so that the metal foil conducting the current will be sufficiently heated by the current passing between electrodes to ignite in air at least at the limited area point. That limited quantity of metal is referred to herein as "notched" since it is readily so formed, merely cutting a portion of the metal with a notch or groove to provide two larger bodies of the metal conductively bridged together by the residual uncut metal portion. That bridging portion of the metal may be formed in any manner so that the term "notching" as used herein is intended in its broadest sense to form a foil into portions bridged together by metal whose smaller area provides greater resistance to current passage.

According to this invention, metal discs of such controlled thickness and suitably notched to provide a narrow point for ignition purposes can be placed over electrodes conducting current thereto and ignited by applying a moderate breakdown current. Such current is sufficient to heat the metal to igniting temperature at the narrowest notched point, whereby the ignition produces the requisite flash by combustion of the thin metal.

Inasmuch as the metal foil burns very rapidly to produce the flash, it may be mounted upon any backing material for ready handling, even such materials as are themselves combustible. Accordingly, it is useful to mount the thin notched metal foil upon a tape-like backing of any pliable substance such as cellulose tape or organic tape or wrapping film bodies, commercially available as Cellophane, Saran, Pliofilm or the like. The metal foil may be coated on one side with an adhesive of any suitable character for securing to the supporting film. The tape may be further perforated for purposes of allowing the electrode to penetrate into current conductive contact with the metal foil. The tape can have as many individual discs of metal foil as desired. The discs are removed one at a time as needed, and fixed upon an electrode and used, or the tape as a roll can be mounted in a holder and unwound at a rate to distribute the discs as carried by the tape over electrodes supported in a typical light reflector including individual means for winding and unwinding the tape as the flashlighting discs are used photographically for each flash. The flash assembly can be suitably mounted on a camera with synchronous actuation switches, synchronized to ignite a flashlight disc when the camera has its photographic paper exposed for taking a picture.

The several features of the invention are further described in relation to the drawings in which:

FIG. 1 is a perspective of an assembly of the photograph flashholder hereof with a camera for use in combination;

FIG. 2 is a perspective of a side elevation of the flashholder assembly with one side opened and in section to show mounting of the tape on reels;

FIG. 3 is a metal foil disc in a form as it can be notched for individual flash purposes;

FIG. 4 is a detailed perspective of a single metal foil disc of FIG. 3 mounted on film backing material such as tape and with an outer removable covering as a laminate thereon;

FIG. 4a is a similar view illustrating the manner of removal of the outer protective covering which is shown to be partially removed to further illustrate the laminated construction;

FIG. 5 is a tape assembly of many metal foil discs without protective covering;

FIG. 5a is a rear view of the same tape as shown in FIG. 5;

FIG. 6 illustrates a modified foil tape holder for flashing an extended tape length;

FIG. 7 illustrates a modification in which a triple flash is obtained by operating three tapes simultaneously, and FIG. 8 is a perspective view of a device in which single foil discs may be mounted for flashlight use.

The notched disc flashlight, as well as a squib igniter, is illustrated as a disc 36 in FIG. 3, which is cut from a thin sheet of metal foil, such as aluminum foil of a thickness as defined above. It may be of any shape notched to a narrow bridging wall section A at the apex of the notch, which integrally joins the foil portions. That narrow wall portion designated by A in FIG. 3 and 6 can be either a short neck portion at one point above a notch 82 as in FIG. 6, or it can be a radial distance A of a foil body cut as a ring or torus as shown in FIG. 3 in which all points of the ring have a radial dimension A. In both cases the radial dimension is such that the aluminum foil comprising the neck portion of radius A will become hot enough to ignite in air at that point by passage of the electric current momentarily through that neck A or radial dimensioned A ring.

The curent is a typical momentary discharge of a condenser to supply a high voltage comprising a several hundred to several thousand volt surge momentarily to effect the heating of the foil at the point A and its ignition and flash combustion in air.

Referring to FIG. 3, the disc 36 has a central hole 37 cut therein so that the remaining foil of the body portion has a radial dimension A. That dimension A can be approximately the same as the diameter of the hole 37, about ¼ to ½ inch. The body portion A is cut away at 38, severing the disc, so that the disc 36 is electrically discontinued at this point by the gap formed, dividing adjacent foil parts into legs 49.

As shown in FIGS. 1, 7 and 8, the metallic foil disc 36 is mounted over a pair of electrical contacts 39 and 40 in the region of the legs 49 so that a discharge voltage across the electrodes 39 and 40 passes annularly around the disc 36, heating the same to ignition temperature and, almost simultaneously, the disc ignites in air to produce the desired photoflash light. The total quantity of foil metal is controlled to give the desired quantity of heat and light by its combustion.

Each individual foil disc, as shown in FIG. 3, can be mounted over the electrodes 39 and 40 as shown in FIG. 8 and ignited by discharging the current therethrough.

For purposes of handling each disc comprising the thin metal foil, they are desirably mounted upon any plastic film or tapelike body 42. As shown in FIG. 4 and 4a, a protective sheath formed as a disc of paper or plastic film 44 sized to fit is slightly adhered to the top of the metal disc to avoid wrinkling while it is being handled as a single disc in use. The protective sheath 44 is temporarily and only lightly adhered to the metal foil on one outer exposed surface such as with a pressure sensitive adhesive which in turn temporarily and even more lightly adhered to the plastic film base 42 in the same way. In use of this simplified form, the metal foil 36 together with the protective sheath 44 are removed from the base sheet 42 mechanically and the assembly of the sheath 44 and metal foil disc 36 are then pressed upon the electrodes 39 and 40 as shown in FIG. 8. Thereafter, the protective paper 44 upon the foil is removed as shown in FIG. 4a by folding upward to two outer edges of the protective sheath 44 and thus to remove it, since it is only slightly adhered to the metal foil. The metal foil disc 36 itself is readily removed since it too is adhered by a pressure-sensitive adhesive only slightly more strongly adhered to the paper sheath than its opposite face to the tape 42. With each flashlight use the metal foil 36 is quickly completely burned to a metal oxide such as aluminum oxide. Thereafter, another metal foil disc is emplaced for use as needed. The protective sheath 44 is desirable for ready handling of the metal foil as an individual disc but it is not essential for the overall operation. Such sheath may be omitted with each disc being handled, somewhat more awkwardly, directly by hand.

In a preferred form and method of use, as shown in FIG. 5, the discs 36 are mounted on a long plastic tape 46 of any stable flexible material which may be coiled, such as Cellophane, Saran or Pliofilm or the like. The discs are suitably spaced as desired, non-critically, but at least out of contact with each other. The tape 46, as shown in FIG. 5a, has perforations 48 therein spaced according to the mounting of the discs as in FIG. 5, with the perforations each underlying one of the legs 49, and through which electrodes 39 and 40 are adapted to extend through the tape to contact the complimentary legs 49 of the metal disc on the opposite side of the tape to supply igniting current thereto. In this preferred form, advantage is taken of the fact that the metal foil is heated by the electric current and ignites in air so rapidly, in a flash, as to produce adequate light for photographic purposes, but the combustion is so rapid that generally insufficient heat produced in the flash is transferred to the tape support to affect the tape in any way. For this reason the tape can be of any flexible support material, except materials of inadequate strength and stability to provide the useful support in the presence of the momentary flash. Thus, as the tape carrying the foil is positioned over an electrode and the disc on its exposed face is ignited thereby, the disc becomes hot enough to flash, burns in air with a flash to produce the requisite light, but does not destroy the tape. For this reason the several discs are most readily handled in the form of the tape and the tape with the discs thereon may be wound in a spool supply of flexible discs. After use of each disc in the sequence of flashes, the residual tape can be wound up upon a receiving spool. In this coiled form, the ignitable metal discs are protected by consecutive coil layers of the plastic base support so that no protective sheath 44 is needed.

For purposes of use, the tape 46 is mounted in a flashlight holder 12. As shown in FIG. 2, the holder 12 is a rectangular body having built therein an arcuate flash reflector 13 secured in the front wall of the holder 12. A metal strip 15 forms a rectangular edge of the holder and closures 17 are provided for the sides, but any other box-like container constructions will be useful. The tape 46 is coiled upon a spool 50 fixed to a rotary shaft 52. The shaft 52 has one extending and beveled into a polyhedron against which a tensioning spring arm 54 or keeper supported by a bracket 56 bears. The spring arm 54 allows the tape 46 to be unwound from the coil 50 stepwise, uncoiling as each flat surface of the shaft 52 rotates under the spring arm 54. The center portion of the reflector 13 is closed by a vertical plate 58 which has open slots at the top 60 and bottom 62 through which the tape 46 enters and leaves, thus threaded for exposure of a disc 36 through the center of the reflector 13. The metal foil discs 36 by this construction are thus positioned to be ignited at the center of the reflector 13; that is, in the position shown in FIGS. 1 and 8. For supply of igniting current to the disc 36 in this position, electrodes 39 and 40 comprising two raised electrical contacts are supported in plate 58 extending toward the reflector 13, merely as metallic rounded metal contact bodies which extend away from the inside of plate 58 (not shown) sufficient to penetrate through the perforations 48 in the tape, and electrically contact the metal foil discs 36. The perforations 48 are large enough to allow the protruding contact ends 39 and 40 readily to pass therethrough and electrically contact the metal foil, the tape 46 being supported sufficiently taut for this purpose.

The flash burning of the metal foil does not destroy the tape. Instead, it is passed downward leaving through the lower slot 62 and is rewound upon a spool 64, rotated on spindle shaft 66 supported for rotation in the sides 17 (not shown). To prevent any backlash in the tape 46 being wound and unwound, a second spring arm 68 bears against the spool 64 to maintain continuous tension on the tape. For purposes of completing the electrical current to the electrodes 39 and 40, conduits 32 and 34 extend therefrom to sliding bracket arms 70 and 72 which are cut to slidingly mate with corresponding bracket arms 14 and 16 of any suitable support such as the top 19 of a camera 10 completing the circuit therethrough. For purposes of advancing the tape 46 in winding from spool 50 and rewinding upon spool 64 as the foil discs are used, the spindle 66 has a portion extending through the side wall 17, as shown in FIG. 1, and is fitted with a winding key or knob 74. Thus, the turning of the key 74 advances each foil disc into the center of the reflector 13 in position ready for use by ignition by current passing through electrodes 39 and 40. FIG. 1 illustrates a typical camera box 10 having the flash assembly unit 12 of FIG. 2 mounted thereon by way of slideway brackets 70 and 72 thereof mating with slideway brackets 14 and 16 carried by the camera 10. They provide a ready fastening sliding grip to the camera. The camera has a shutter mechanism 18 electrically synchronized by lead 20 with a flash and camera actuating circuit provided by current source 28. The positive lead of the battery contacts the shutter lead 20 and the bracket 16 by way of lead 30. The bracket 16 further provides current to one of the electrodes 39 by way of brackets 72 and lead 32. The negative electrode of the battery 28 has a lead 24 interrupted by a hand button switch 22 passing to grounder 26 and the second electrode 40 likewise is grounded by way of conduit 34 through the slideway brackets 14 and 17, the latter completing the ground contact 40 through line 34. A condenser 23 in line 25 mounted across the poles of the power source 28 discharges a surging high potential current, highly amplified voltage through the leads 39 and 40 to ignite the disc foil 36 when the current is completed in line 24 through manually pressing the button switch 22. Simultaneously, current completed to shutter 18 will expose the film in the camera for photography. After each such ignition the key 74 will be turned to position another foil disc 36 for ignition over the electrodes 39 and 40 in the center of the reflector 13. The flashing continues in this manner stepwise as each picture is taken through shutter 18 of the camera.

For additional light, several foil discs supported on several tapes 46 in a modified construction as shown in FIG. 7, can be aligned for simultaneous flash with a large reflector 13, thereby giving as much increased light as may be needed by use of several foil ignitions effected simultaneously. As further shown in FIG. 7, the center tape 46 can have two foil discs 36 aligned on the same tape entering through an upper slot 60 but passing to the forward end of the reflector 13 to leave by a frontally displaced slot 63 therein. A second set of electrodes 39a and 40a are mounted substantially horizontally in the lower part of the reflector 13 so that upon ignition of the lower foil disc 36 lying substantially horizontally at the bottom of the reflector, the light is projected upward toward the ceiling to give a bounce illumination effect. The horizontally lying foil, or both horizontal and vertical can be ignited for controlled flash illumination as desired. In this manner it is possible with versatility to provide light directed above the photographic object toward the ceiling or light directed toward the object from the center of the reflector or to provide double or triple illumination alternately both directly on the object and indirectly from the ceiling to give substantially increased illumination from a single tape which has two discs or several tapes ignited at once.

It is sometimes desirable to mount and operate the flashlight independently of the camera. For this purpose separate handle means (not shown) can be provided beneath the flash box 12 and to the same effect, the box 12 can be independently held and operated by movement of a hand switch 22 as in FIG. 8.

It is sometimes desirable for extra large flash effect to provide a substantially greater quantity and surface area of metal foil 80 for ignition, as in FIG. 6. For this purpose a length of metal foil such as aluminum has a series of notches 82 cut in from one edge to provide a narrow continuous bridging portion. Above the notches 82 electrical activating current is supplied through leads 84 and 85 in circuit with lead 34 which is grounded and lead 32. These in turn supply current from the supporting bracket elements 70 and 72 as described above, upon ignition of such strip, each of the notched portions 82a, 82b, 82c, etc. becomes a primary source of ignition so that the entire strip 80 burns from a plurality of igniting points giving it a flash of greater intensity, but without substantially prolonged burning time. In use, such metal foil strip 82 is mounted on an organic plastic tape 46 as described above and may be unwound from a spool 86 upon which it is wound and the supporting side walls of a housing 90 through spindles 92 journaled in an inturned supporting flange 93. The entire assembly is then mounted to a camera through the sliding bracket ways 70 and 72 as shown in FIG. 1. That construction of FIG. 6 can be further modified, of course, for operation by surrounding further with a large reflecting shield, as obvious to one skilled in the art.

As thus described, a metal foil shaped as desired such as a disc or elongated as a tape or other shape of selected area and thickness, but notched so that at least a portion comprises a bridge sufficiently narrow to be heated to ignition by an igniting current passed therethrough. The foil may be used as individual discs mounted for convenience on a tape backing from which they can be removed and ignited by being mounted upon electrodes for flashlight use. The foils can be mounted as a series of discs adhered to an organic film tape from which each are ignited electrically by electrodes passing through perforations therein to contact each metal foil disc in sequence, whereby the tape may be used in coiled form mounted in a flashlight holder and advanced in a series through the center of a reflector and then ignited for flashlighting use. The foil can be of any ignitable metal such as magnesium, zinc, iron, cobalt and the like, which will burn in air.

Various modifications will occur to those skilled in the art. The several constructions given herein being intended as exemplary and not limiting except as defined in the claims appended hereto.

I claim:

1. The combination of a camera, a shutter in said camera, a flash reflector having a pair of slots for passing a tape therethrough, a pair of electrical contacts in said reflector, a source of electric current in circuit with said contacts, means in said camera for synchronizing the actuation of the shutter for exposure of film in said camera with the passage of heating current to said contacts, a coiled tape, a series of separated combustible metal foil bodies secured to said tape, each of said foil bodies having a pair of ends adapted to engage said contacts as said tape is passed through said reflector, said bodies each having a predetermined portion of increased resistance between said ends causing ignition of the foil body by passage of large quantities of electrical current through the foil completed through said contacts, an unwinding spool for supporting said coiled tape for series passage of each foil body over said contacts for flash ignition in the said reflector and a wind-up spool for receiving residual tape from which the foil bodies have each been burned in a flash.

2. Apparatus as defined in claim 1 wherein said bodies are each provided with a reduced cross section portion intermediate said ends for causing ignition of said foil body.

3. The combination of a camera, a shutter in said camera, a flash reflector, a pair of electrical contacts near said reflector, a source of electric current in circuit with said contacts, means in said camera for synchronizing the actuation of the shutter for exposure of film in said camera with the passage of heating current to said contacts, a coiled tape, a series of separated combustible metal foil bodies secured to one surface of said tape, each of said foil bodies having a pair of ends adapted to engage said contacts as said tape is passed through said reflector, each of said bodies having a thickness of less than 0.0065 inch and a predetermined portion of reduced cross section intermediate its ends causing ignition of the foil body by passage of large quantities of electrical current through the foil completed through said contacts, an unwinding spool for supporting said coiled tape for series passage of each foil body over said contacts for flash ignition in the said reflector and a wind-up spool for receiving residual tape from which the foil bodies have each been burned in a flash.

4. The combination of a camera, an electrically actuated shutter in said camera, a flash reflector, metal contacts near said reflector, a source of electrical current in circuit with said contacts and with an actuating mechanism for the shutter in said camera, synchronizing the actuation of the shutter for exposure of film in said camera with the passage of heating current to said contacts, a coiled tape having a series of perforations disposed in pairs along the length thereof and spaced to receive said contacts in each pair of perforations, a series of separated combustible metal foil bodies secured to one surface of said tape, each of said foil bodies being mounted across a pair of perforations for electrical communication thereof through said perforations with the said contacts, each of said foil bodies having a portion of increased resistance by being of limited cross section between said perforations originating ignition of the foil body by passage of large quantities of electrical current through the foil completed through said contacts, an unwinding spool for supporting said coiled tape for series passage of each foil body over said contacts for flash ignition in the said reflector and a wind-up spool for receiving residual tape from which the foil bodies have each been burned in a flash.

5. The apparatus as defined in claim 4 in which the reflector is arcuately shaped, and said contacts are mounted close to a forward edge of said reflector whereby metal foil ignited from said forward edge directs light upward.

6. The apparatus as defined in claim 5 wherein electrical contacts are mounted both at the center as well as a forward edge to direct light by ignition of metal foil from both positions both upward as well as forward of said reflector body.

7. Apparatus as defined in claim 4 having a plurality of contacts at about the center of an annular reflector and several coils of tape mounted for simultaneous ignition of a metal foil on each of them through the several contacts of said reflector.

References Cited by the Examiner
UNITED STATES PATENTS

| | | | |
|---|---|---|---|
| 673,386 | 5/1901 | Courtier | 67—34 |
| 1,274,009 | 7/1918 | Courtier | 240—1.3 |
| 2,395,500 | 2/1946 | Oswald | 95—11.5 |
| 2,571,799 | 10/1951 | Van Uden | 67—31 |

NORTON ANSHER, *Primary Examiner*.